(12) United States Patent
Mammou et al.

(10) Patent No.: US 10,602,158 B2
(45) Date of Patent: Mar. 24, 2020

(54) METHOD FOR MAXIMIZING VIDEO SLICE SIZE CONSTRAINT

(71) Applicant: ATI Technologies ULC, Markham (CA)

(72) Inventors: Khaled Mammou, Markham (CA); Ihab M. A. Amer, Markham (CA); Gabor Sines, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 452 days.

(21) Appl. No.: 14/620,036

(22) Filed: Feb. 11, 2015

(65) Prior Publication Data

US 2016/0234491 A1 Aug. 11, 2016

(51) Int. Cl.
| | | |
|---|---|---|
| H04B 1/66 | (2006.01) | |
| H04N 19/174 | (2014.01) | |
| H04N 19/124 | (2014.01) | |
| H04N 19/119 | (2014.01) | |
| H04N 19/15 | (2014.01) | |
| H04N 19/156 | (2014.01) | |

(52) U.S. Cl.
CPC ......... H04N 19/174 (2014.11); H04N 19/119 (2014.11); H04N 19/124 (2014.11); H04N 19/15 (2014.11); H04N 19/156 (2014.11)

(58) Field of Classification Search
CPC .. H04N 19/105; H04N 19/124; H04N 19/176; H04N 19/149; H04N 19/152; H04N 19/44; H04N 19/103; H04N 19/11; G06T 9/00; G06T 2207/10028; G06T 7/50; G06T 19/20; G06T 2219/2012; G06T 5/006; G06T 7/20; G06T 17/005; G06T 1/20; G06T 2207/10024; G06T 2207/30168
USPC ........................................................ 375/240
See application file for complete search history.

(56) References Cited

U.S. PATENT DOCUMENTS

| | | | |
|---|---|---|---|
| 2006/0039483 A1* | 2/2006 | Lee ...................... | H04N 19/174 375/240.28 |
| 2013/0089140 A1* | 4/2013 | Kudana ................ | H04N 19/172 375/240.03 |
| 2013/0128949 A1* | 5/2013 | Sezer ................... | H04N 19/119 375/240.02 |
| 2014/0072030 A1* | 3/2014 | Zhou ..................... | H04N 19/119 375/240.02 |

(Continued)

*Primary Examiner* — Masum Billah
(74) *Attorney, Agent, or Firm* — Volpe and Koenig, P.C.

(57) ABSTRACT

A method and apparatus to maximize video slice size is described herein. The method packs as many macroblocks as possible within a capped-size slice, while preserving user-defined quality constraints. The probability to conform to the maximum slice size constraint may be adjusted according to a user-defined parameter. The method may be integrated into a rate control process of a video encoder. The method predicts whether encoding a macroblock with a quantization parameter exceeds a current slice size constraint. It further predicts whether encoding a given number of macroblocks with a given configuration of quantization parameters exceeds the current slice size constraint. The method then proceeds to encode the current macroblock either on a condition that encoding the given number of macroblocks with the given configuration of quantization parameters falls below the size constraint of the current slice or after determining that a new slice is needed.

19 Claims, 6 Drawing Sheets

(56) References Cited

U.S. PATENT DOCUMENTS

2014/0098857 A1\* 4/2014 MacInnis ............... H04N 19/46
                                                    375/240.03
2016/0227242 A1\* 8/2016 Amer .................... H04N 19/593
2016/0227244 A1\* 8/2016 Rosewarne .......... H04N 19/105

\* cited by examiner

METHOD FOR MAXIMIZING VIDEO SLICE SIZE CONSTRAINT

FIELD

The present disclosure is generally directed to encoding, and in particular, to video encoding.

BACKGROUND

The transmission and reception of video data over various media is ever increasing. In some use cases, such as ultra-low latency use cases, latency is a big issue. In these use cases, the delay resulting from encoding the entire frame before transmission is not acceptable as latency is a critical parameter in functionality and user experience. Consequently, whatever video data that has been encoded has to be sent immediately. Therefore, a major requirement for these ultra-low latency use cases or applications is to increase network efficiency by packing as many macroblocks as possible within an encoded video slice, while considering given constraints on maximum slice size as well as quality.

SUMMARY OF ONE OR MORE EMBODIMENTS

A method and apparatus to maximize video slice size is described herein. An example method packs as many macroblocks as possible within a capped-size slice, while preserving user-defined quality constraints. The probability to conform to the maximum slice size constraint may also be adjusted according to a user-defined parameter. The method may be integrated into a rate control process of a video encoder. In an embodiment, the method predicts whether encoding a macroblock with a quantization parameter exceeds a size constraint of a current slice of a frame. It further predicts whether encoding a given number of macroblocks with a given configuration of quantization parameters exceeds the size constraint of the current slice on a condition that encoding the macroblock falls below the size constraint of the current slice. The method then proceeds to encode the current macroblock either on a condition that encoding the given number of macroblocks with the given configuration of quantization parameters falls below the size constraint of the current slice or after determining that a new slice is needed.

BRIEF DESCRIPTION OF THE DRAWINGS

A more detailed understanding may be had from the following description, given by way of example in conjunction with the accompanying drawings wherein.

DETAILED DESCRIPTION OF ONE OR MORE EMBODIMENTS

Figure 1:
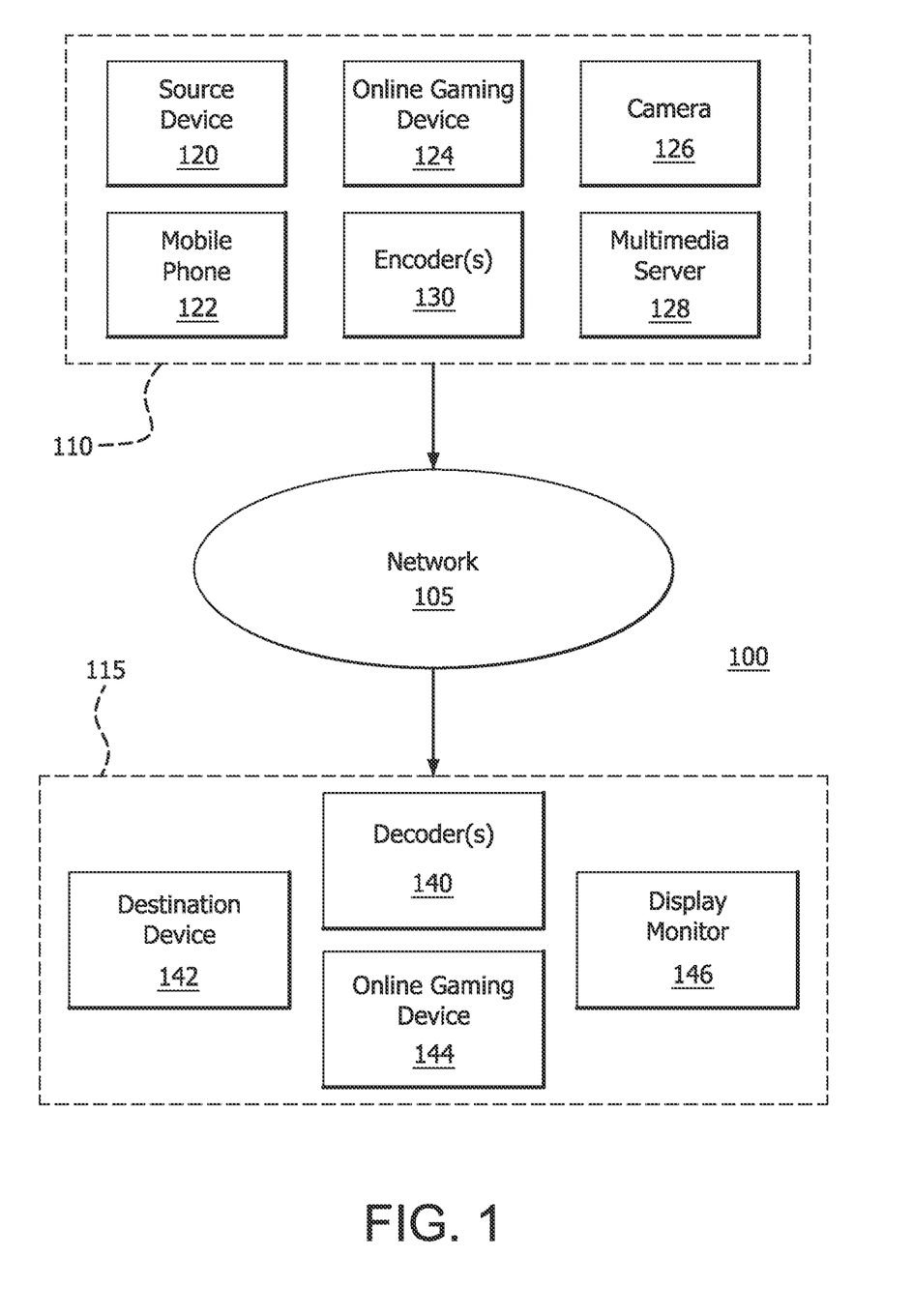
FIG. 1 is an example system architecture that uses video encoders according to some embodiments.

FIG. 1 is an example system 100 that uses video encoders as described herein below to send encoded video data over a network 105 from a source side 110 to a destination side 115, according to some embodiments. The source side 110 includes any device capable of storing, passing, capturing or generating video data that may be transmitted to the destination side 115. The device may include, but is not limited to, a source device 120, a mobile phone 122, online gaming device 124, a camera 126 or a multimedia server 128. The video data from these devices feeds encoder(s) 130, which in turn encodes the video data as described herein below. The encoded video data is processed by decoder(s) 140, which in turn sends the decoded video data to destination devices, which may include, but is not limited to, destination device 142, online gaming device 144, and a display monitor 146. Although the encoder(s) 130 are shown as a separate device(s), it may be implemented as an external device or integrated in any device that may be used in storing, capturing, generating or transmitting video data.

Figure 2:
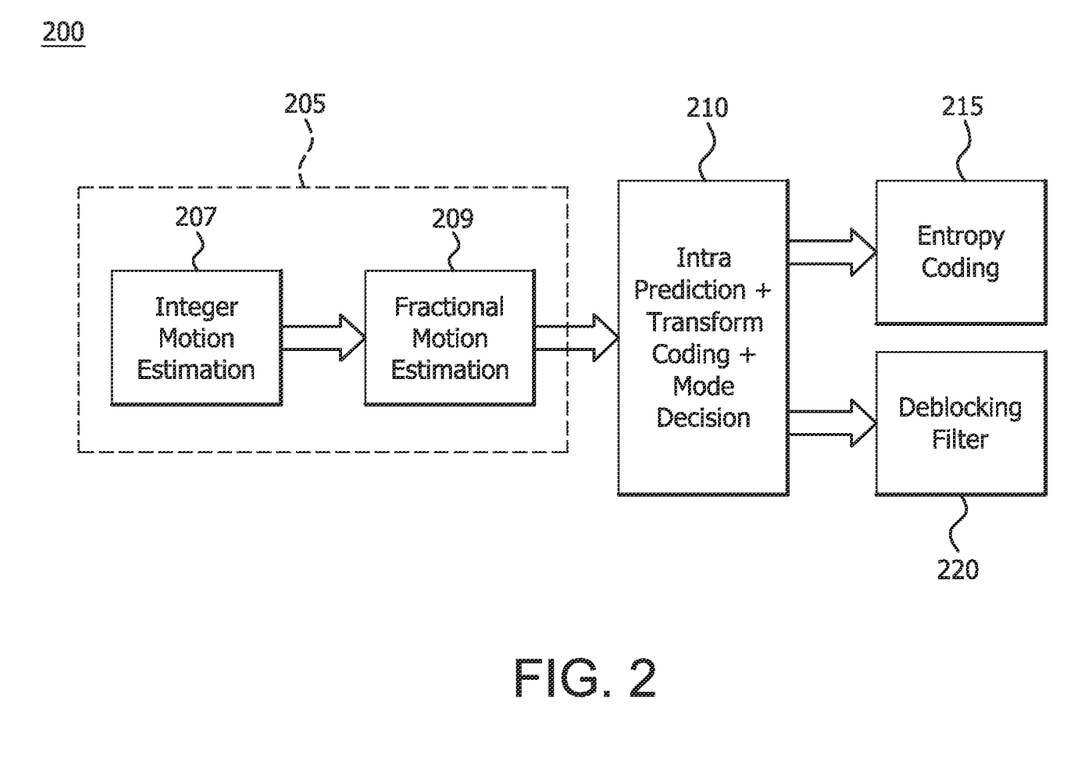
FIG. 2 is an example hardware pipeline in a video encoder.

FIG. 2 is an illustrative hardware pipeline in a video encoder 200. A predetermined or given set of macroblocks is input to a motion estimation module 205, which includes an integer motion estimation module 207 and a fractional motion estimation module 209. The motion estimation module 205 outputs an estimated motion information, which is acted upon by a prediction module 210. The prediction module 210 performs prediction, transform coding and mode decision and outputs predictive motion vectors. An entropy coding module 215 compresses and encodes using at least information from the predictive motion vectors. A deblocking filter module 220 removes blocking artifacts and improves picture quality using at least information from the predictive motion vectors. The hardware pipeline shown in FIG. 2 is an illustrative embodiment, and one of ordinary skill in the art my implement other embodiments that are within the scope and teachings of the specification.

Latency is a big issue in the transmission and reception of video data over, for example, a network. Two aspects need to be considered: 1) when to transmit the data, (or stated alternatively, how much data should be sent); and 2) balancing aspect 1 with network efficiency.

The former aspect may be illustrated with respect to a tablet and cloud gaming. The tablet is not necessarily equipped to handle heavy game loading and, as a result, the heavy computational loading, such as rendering for example, takes place on a server. For example, when a user plays a game on the tablet using key strokes, touch action and the like, a signal is sent to the server by the tablet. The server, in response to the signal, encodes an appropriate rendering in a video frame using for example the encoder pipeline of FIG. 2, and transmits the video frame to the tablet. This is repeated for each user action on the tablet. This is effectively a closed-loop system with many sub-modules, any of which may a bottleneck with respect to latency. The user does not want to wait to see what happens with respect to an action. This would make the game unplayable, (actually or from an end-user experience and/or satisfaction perspective). Consequently, some systems transmit whatever is encoded immediately to reduce the latency issue and other systems wait for the entire frame to be encoded before transmission. The delay resulting from encoding the entire frame before transmission is not acceptable as latency is a critical parameter in functionality and user experience. The better approach is to transmit a slice of the frame, where the slice represents a portion of the frame. The query is then how to determine the size of the slice.

This slice size determination should also optimize for network efficiency. There is a need to transmit as much data or macroblocks (MBs) in a packet as possible. Network efficiency is affected by how many packets are being sent. The greater the number of packets being transmitted, results in an increase in the corresponding overhead and a decrease in network efficiency. If the number of packets being transmitted is minimized, then the amount of overhead decreases and the network efficiency increases.

An approach to balancing the two aspects described above, is to use a parameter that sets a slice to be less than a certain number of bytes to address, for example, robustness or other like criteria. This approach, however, is not practical for hardware encoders because, as shown in FIG. 2, hardware encoders use a pipelined architecture where many stages are running on different data at the same time. These use application-defined threshold(s) trigger the process of starting a new slice. These thresholds may be static or adaptive. However, the user/application will be responsible for their accuracy. Again, whenever the cap size is violated, either a decision to backtrack and re-encode is to be taken, or the slice is submitted as is, causing it to be split among two different IP packets.

Figure 3:
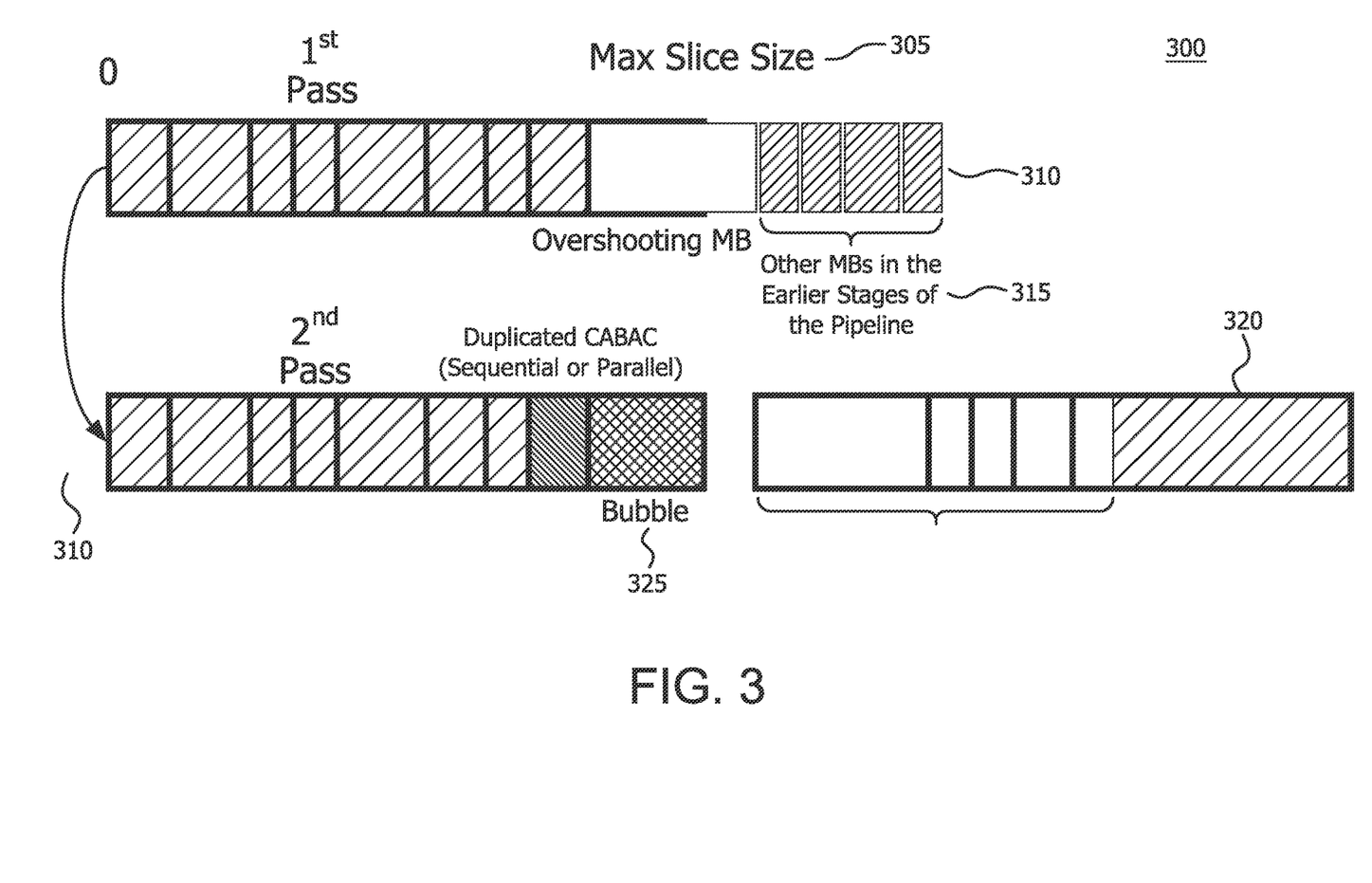
FIG. 3 is an example diagram of processing slices and macroblocks.

FIG. 3 illustrates MB blind encoding, where multiple MBs are being processed in an encoder pipeline 300. As can be seen, by the time a determination has been made that a maximum slice size has been reached (305) in a current slice 310, multiple MBs have already been partially encoded in the pipeline (315). This is problematic because each slice is independent of other slices and the later MBs do not know that the current slice is full and their reliance on the previous MB is now invalid since the current slice is complete. In this instance, the encoder flushes the pipeline and re-encodes the MBs 315 again assuming a new slice 320. This results in a penalty in terms of latency and redundancy. In addition, the current slice 310 has a bubble region 325 indicative of network inefficiency, where the greater the bubble the less the network efficiency.

In general, capping the size of an encoded video slice is a requirement for most of the low-latency applications that involve streaming encoded video content over Internet Protocol (IP) networks. For reduced latency reasons, such applications typically stream their content via User Datagram Protocol (UDP) network protocol, which does not fully guarantee the arrival of all the sent packets to the destination, and does not preserve order. Hence, such applications would like to provide the target decoders at the users' sides with the capability to decode the content of every packet as it receives it, without having to wait for other packets that contain content that precedes it in the encoding order. This can be achieved by making sure that, (as much as possible), every UDP packet contains a stand-alone video slice that can be decoded independently as it is received. Also, for error resiliency reasons, it is preferred to isolate the impact of losing a UDP packet, by making sure that, (as much as possible), none of the other packets contain video material that relies on the lost packet in order to be decoded.

Described herein are various embodiments of methods and systems that increase network efficiency by packing as many MBs as possible within an encoded video slice, while considering given constraints on maximum slice size as well as quality. Such methods and systems satisfy aspects of the above requirements smartly, by reaching an improved or optimal compromise between the different design aspects, such as latency, network efficiency, quality, throughput, and power consumption.

In an aspect, various methods and systems not only focus' on trying to close the slice right before encoding the MB that would have caused a violation of the size constraint, but also provide the ability to bias the system's rate control method so that more MBs can be squeezed in without significantly dropping quality.

In another aspect, an application is allowed or able to trade quality with throughput while maximizing the number of MBs to be packed within the capped-size slices. The more the number of MBs that are looked ahead, the less the impact on quality, but the more the performance penalty, and vice versa.

In another aspect, for a subset of video encoders, (such as many fixed function hardware encoders), where the flexibility to backtrack and re-encode is not available, having to stop encoding before violating the cap size is very crucial. Otherwise, noticeable degradation in throughput and/or network efficiency is unavoidable. The method and system provides a mechanism that allows adjusting the accuracy of the decision to stop encoding based on a user-defined accuracy level, as well as the video content. In general, a prediction is made that maximum slice size is imminent or being approached, i.e. the cap of the slice. Based on this prediction, processing of additional MBs is stopped so that re-encoding becomes unnecessary.

Figure 4:
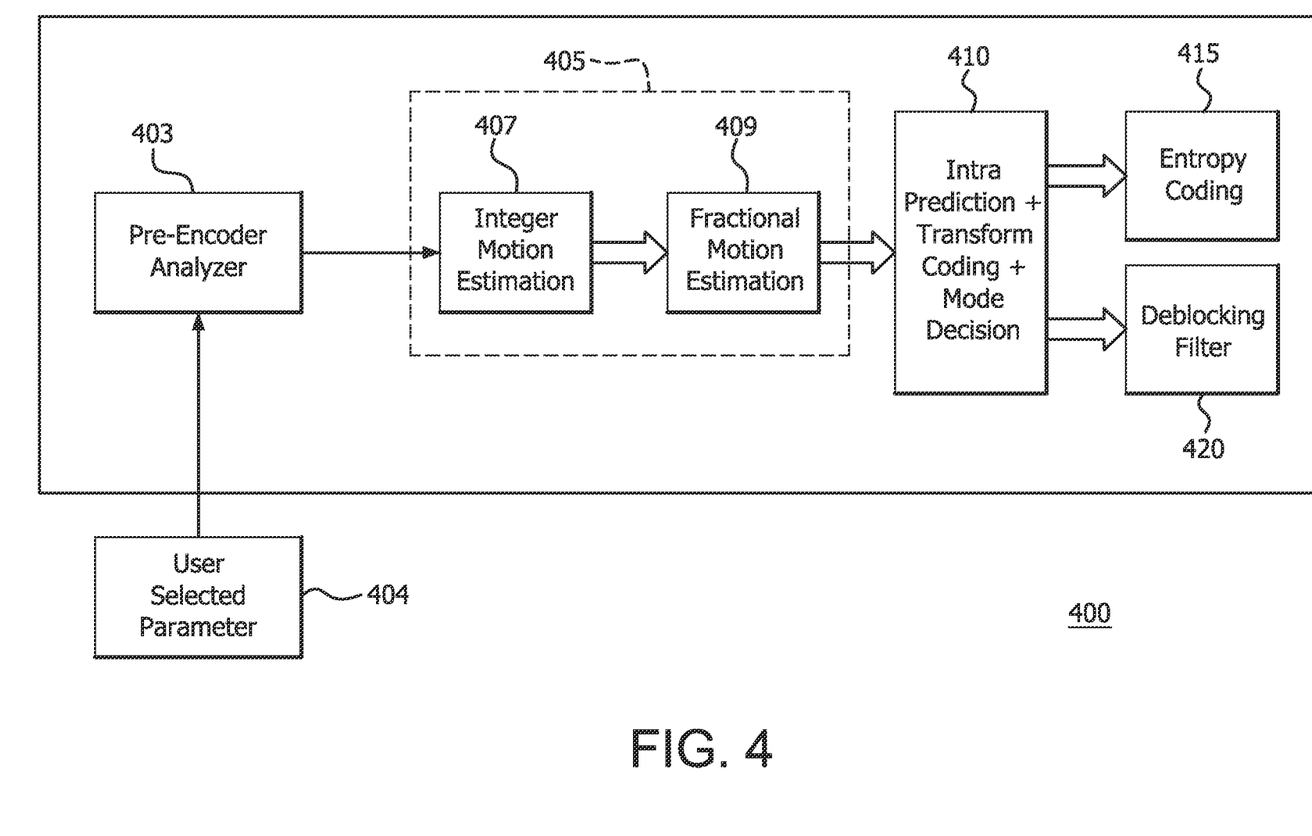
FIG. 4 is an example hardware pipeline in a video encoder according to some embodiments.

FIG. 4 is a hardware pipeline in a video encoder 400 in accordance with some embodiments of the invention. The video encoder 400 includes a pre-encoder analyzer 403 that uses a set of user selected parameters 404 and a quantization parameter (QP) to predict if a maximum cap slice is being reached based on short term and long term effects of a determined QP. The outcome or results of the pre-encoder analyzer 403 is input to a motion estimation module 405, which includes an integer motion estimation module 407 and a fractional motion estimation module 409. The motion estimation module 405 outputs an estimated motion information, which is acted upon by a prediction module 410. The prediction module 410 performs prediction, transform coding and mode decision and outputs predictive motion vectors. An entropy coding module 415 compresses and encodes using at least information from the predictive motion vectors. A deblocking filter module 420 removes blocking artifacts and improves picture quality using at least information from the predictive motion vectors. The hardware pipeline shown in FIG. 4 is an illustrative embodiment, and one of ordinary skill in the art my implement other embodiments that are within the scope and teachings of the specification.

Figure 5:
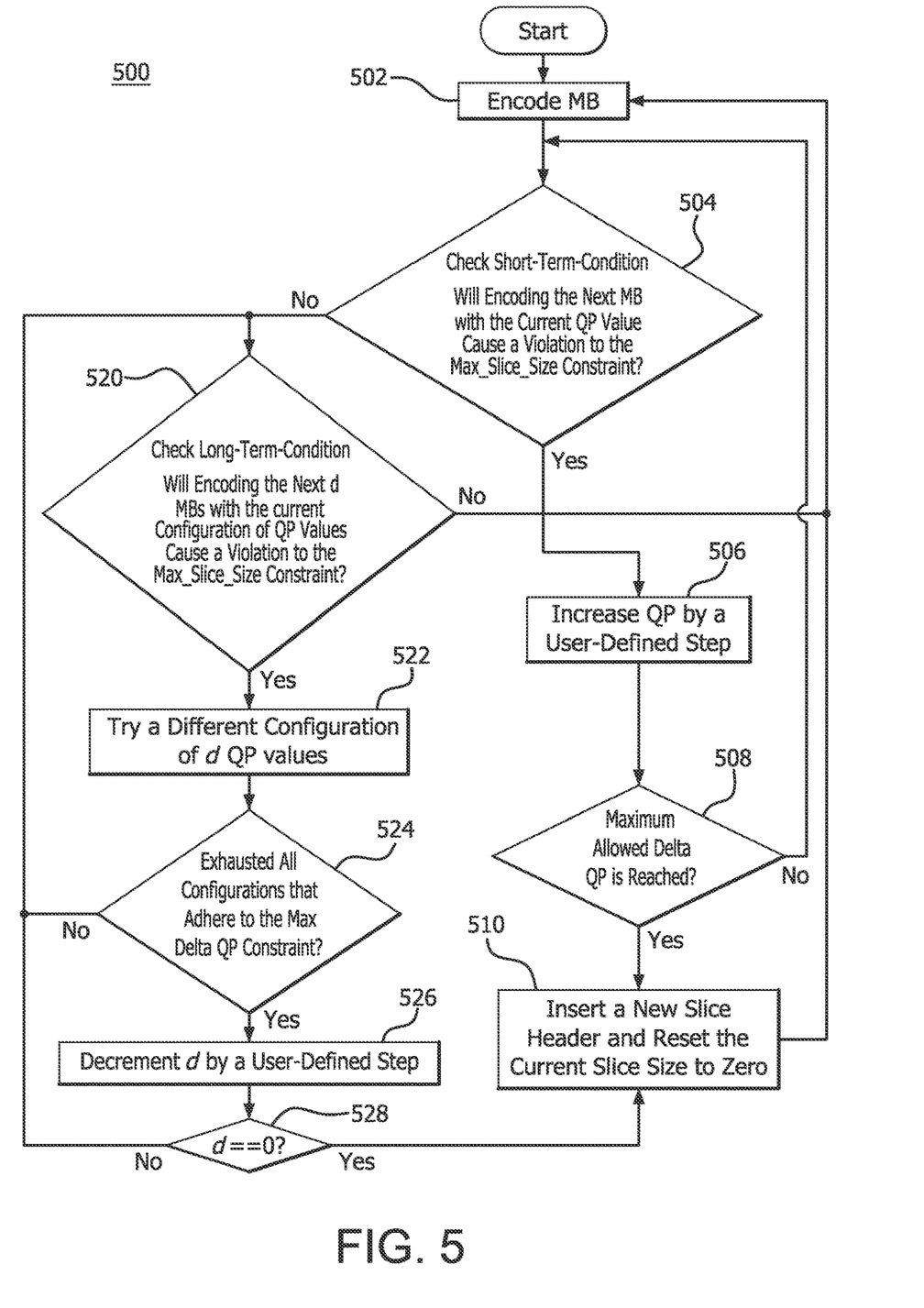
FIG. 5 is an example flowchart for processing video data using a video encoder according to some embodiments.

FIG. 5 is an example flowchart of a method 500 for processing video data using a video encoder, for example video encoder 400 of FIG. 4, according to some embodiments. The method may use the following notations/definitions:

$X_{Max}$: the maximum slice size specified by the user;
$X(i)$: the number of bits actually spent on encoding the first i macroblocks in a current slice;
$B(i)$: the number of bits actually used to encode the $i^{th}$ macroblock of the current slice;
$qp(i)$: the QP (Quantization Parameter) value used to encode the $i^{th}$ macroblock of the current slice;
$B_{Max}(q, mb\_type)$: the predicted maximum number of bits needed to encode a macroblock of type mb_type=I, P or B with QP=q;

P(i, d, q): the predicted number of bits to encode the macroblocks (i+1) to (i+d) by the using a quantization parameter (QP) q;

qstep: the step size to vary q with; and dstep: the step size to vary d with, where the method takes as inputs the following parameters:

$X_{Max}$: maximum slice size;

Δqmax: maximum allowed QP variation (the application may prefer to avoid sudden fluctuations in quality within the picture);

d: number of macroblocks to look ahead;

ε: Maximum accepted probability to generate a slice with a size higher than $X_{Max}$ (ε can be changed on a per-picture basis);

qstep: used to adjust the level of granularity for the variation of q; and dstep: used to adjust the level of granularity for the variation of d.

In general, the QP controls the quality of the image or picture. The greater the QP, the greater the amount of information that is removed and therefore the lower the quality. The QP is changed as described herein below to manipulate the number of bits needed for the MB without impacting the quality of the video so that more bits may be fit into the slice. As stated herein above, the less the number of slices that need to be transmitted, the greater the network efficiency.

In general, the parameter ε controls how often a prediction may fail in terms of overshooting the cap size of the slice or alternatively, how often a slice has remaining space but did not want to risk overshooting the cap size of the slice.

The objective of the method 500 is to encode the input picture with a minimum number of slices, while making sure that the probability $\Pi(X(i)>X_{Max})$ (probability of generating a slice of i macroblocks with a size X(i) that is higher than the user-defined parameter $X_{Max}$) is lower than ε. Also, other user-defined constraints need to be preserved. The method proceeds iteratively and decides at each step whether to start a new slice after encoding the current MB or not, (after trying various alternatives seeking a way to increase the likelihood to fit in one or more of the succeeding MBs). In the proposed method, there are two conditions that need to be checked: a short-term condition, and a long-term condition.

The short term condition analysis determines whether the number of bits being generated is greater than the number of bits that should be generated for the current slice (504). That is, will the generated number of bits exceed the maximum cap size of the current slice. In terms of the parameters shown above, the short term condition analysis determines whether encoding of the next MB with a current QP value causes a violation of the maximum slice size constraint. If the maximum slice size constraint will be exceeded, the QP value is increased so that less bits are needed for encoding the next MB. However, this decreases the quality. The method 500 therefore manages the degree or step amount that QP can change (506) and whether the maximum allowed delta QP has been reached (508). The latter is effectively a control on how bad the quality may be allowed to go to. The latter two steps collectively control how much the QP value may be changed to fit more MBs into the same slice. If the maximum value of delta QP has been reached, then there are too many bits and a new slice needs to be generated (510) after the current MB is encoded (502). If the maximum value of delta QP has not been reached, then it is determined how many bits are needed to encode the next MB with the new QP. This continues until the number of bits needed to encode the next MB falls below the maximum number of bits in the slice has or the maximum value of delta QP has been reached.

Specifically, the short term condition initially determines if $(X(i)+B_{Max}(q, mb\_type)>X_{Max})$, i.e. if using $B_{Max}(q, mb\_type)$ bits to encode the next MB will generate a slice size that is higher than $X_{Max}$. If this condition is satisfied, then higher values of q are examined, until either a value that does not satisfy the condition is found, or the maximum allowed Δqmax is reached. If Δqmax is reached, then an end of slice will be forced after encoding the current MB. In more details, the function FindQP1( ) tries to find the lowest QP value $q_{new}$ in the set S(q)={q+qstep, . . . , q+Δqmax} such that $X(i)+B_{Max}(q_{new}, mb\_type)<=X_{Max}$, (short-term condition is unsatisfied). If no possible solution could be found then a new slice is started after encoding the current MB. Otherwise, and if the long-term condition is also satisfied, the next MB is encoded as part of the current slice with QP value $q_{new}$.

The term $B_{Max}(q, mb\_type)$ represents a prediction of the maximum number of bits required to represent the next MB, (a description of this prediction process is described herein below after describing the method presented in flowchart 500). This condition is expected to be more restrictive, (more cautious), than the long-term condition. For some types of encoders (more specifically hardware ones), back-tracking for a single MB is not an option; hence, it is more desirable to get this condition to be more binding, rather than to loosen it, causing so many breaks of the cap condition.

Returning to FIG. 5, once the QP value has been selected that does not violate the maximum slice size constraint, the long term condition analysis determines what a change in the QP value has on the overall video presentation. The issue is that if the video is presented with good quality for long periods and lesser or "bad" quality for a short period, it is noticeable to the user. Consequently, any changes in the QP value should also consider long term conditions. The method 500 therefore determines whether encoding the next d MBs with the current configuration of QP values will cause a violation of the maximum slice size constraint (520). If using the current configuration of QP values does not violate the maximum slice size constraint, then the current MB is encoded (502) and the process starts over again.

If using the current configuration of QP values does violate the maximum slice size constraint, then different configurations of d QP values are tried to fit as many MBs in the slice (522). For example, each MB can have a different QP value. In another example, some MPs may have the same QP value and some MPs may have different QP values. In another example, all MPs may have the same QP value. Continue trying all combinations or configurations of d QP values until all such combinations or configurations have been exhausted (524). If all combinations or configurations have been exhausted, then decrement d by a user defined parameter (526). Determine if the value of d is zero (528). If d is zero then a new slice is started after encoding the current MB (510 and 502). If d is not zero then repeat the long term condition analysis.

Specifically, the long term condition analysis is if $(X(i)+P(i, d, q)>X_{Max})$, i.e. whether using P(i, d, q) bits to encode the next d MBs will generate a slice size that is higher than $X_{Max}$. If this condition is satisfied, then higher values of q are examined, (for various combinations of the d MBs), until either a value that does not satisfy the condition is found, or no solution is found that does not cause Δqmax to be exceeded. If no solution is found, then d MBs are not squeezable according to the method, and a lesser number of MBs will be considered. Hence, the method iterates, but with a lesser value of d. In more detail, the function FindQP2( ) tries to find the lowest QP value(s) $q_{new}$ in the set $S(q)=\{q+qstep, \ldots, q+\Delta qmax\}$ such that $(X(i)+P(i,d,q_{new}) <= X_{Max})$ (long-term condition is unsatisfied). If no possible solution could be found, then the method decreases the number of look-ahead MBs d by dstep and repeats the search for $q_{new}$.

The method is repeated until one of the following occurs. In a first instance, either d becomes equal to zero, which means that according to the long-term condition, not a single MB is squeezable (after the current MB) without breaking either the maximum slice size condition or $\Delta qmax$. In this case, an end of slice will be forced after encoding the current MB. In another instance, a value $d_{new}$ is found, where the long-term condition is satisfied. In this case, and if also the short-term condition is satisfied, the next MB is encoded as part of the current slice with QP value $q_{new}$.

The method of looking ahead (satisfying the long-term condition) allows gradual changes in QP to fit more MBs, rather than sudden changes that cause subjective quality degradation. The term P(i, d, q) represents a prediction of the number of bits required to represent the next d MBs. The prediction process is described herein below.

As stated herein above, a prediction method is used to predict 1) the number of bits required to represent the next MB for the short term condition analysis and 2) the number of bits required to represent the next d MBs for the long term condition analysis. As stated previously, the term $B_{Max}$(q, mb_type) represents a prediction of the maximum number of bits required to represent the next macroblock. In this equation, the term mb_type is for the mode of encoding. As known to one of ordinary skill in the encoding arts, there are generally two modes of encoding, (as used for mb_type): 1) intra-frame coding which is harder as it does not use a reference and 2) inter-frame coding which uses a reference frame, (where the reference frame may be an I frame, a P frame (forward predicted picture) or a B frame (bidirectionally predicted picture). The term q is quality and tied to the quantization parameter.

In an example, a Gaussian or normal distribution may be used for the prediction method. As known to one of ordinary skill in the art, if a certain error probability is desired, then the average plus a given number of standard deviations may be used assuming that, as in this example, the number of bits for every MB has a Gaussian distribution. Therefore if a 2% error is acceptable, then this would require average plus two standard deviations.

In another example, sophisticated embodiments using information of spatial and temporal neighbors could be considered such as the quadratic embodiment discussed in Ling Tian, Yu Sun, Yimin Zhou, Xinhao Xu, Analysis of quadratic R-D model in H.264/AVC video coding, IEEE International Conference Image Processing (ICIP), 2010, which is herein incorporate by reference in its entirety.

In another example, a low-complexity embodiment adapted for hardware implementations and exploiting the number of bits and QP of the last encoded MB may be used, (i.e., B(i) and qp(i)). In this example, assume that the next d MBs would have the same size. The predicted number of bits for the next d MBs P(i,d,q) is given by: $P(i, d, q) = d(1-\alpha)^{(qnew-qp(i))}B(i)$. Each time an MB is encoded, the actual number of bits B(i) used to encode the MB and its associated QP qp(i) are used to updated the model $B_0$ (qp(i)) by using the function UpdateMaxMBSize( ) It is noted that $(B_0(q))_{0 <= q <= 51}$ are initialized at the beginning of the method by using the function GetInitialMaxMBSize( ) which exploits pre-computed statistics obtained by encoding offline a representative dataset of videos.

Different embodiments could be considered in the implementation of the two functions UpdateMaxMBSize( ) and GetInitialMaxMBSize( ). In an example, a method is presented that approximates the distribution of the number of bits per MB for each possible QP q in the set $\{0, \ldots, 51\}$ by a normal distribution G(q), where we denote $\mu(q)$ and $\sigma(q)$ the mean and variance of G(q), respectively. The function GetInitialMaxMBSize( ) uses the pre-computed values of $\mu(q)$ and $\sigma(q)$. The function UpdateMaxMBSize( ) updates $\mu(qp(i))$ and $\sigma(qp(i))$ by considering the number of bits used for the last MB. $B_0(q)$ is computed based on the parameter $\epsilon$ and the update $\mu(q)$ and $\sigma(q)$ by exploiting the user-defined parameter $\epsilon$ and the cumulative distribution function of the normal distribution as is known to one of ordinary skill in the art. More precisely, the look-up table Table 1 may be used.

TABLE 1

| $\epsilon$ | $B_0(q)$ |
|---|---|
| 15.9% | $\mu(q) + \sigma(q)$ |
| 6.7% | $\mu(q) + 1.5\sigma(q)$ |
| 2.3% | $\mu(q) + 2.0\sigma(q)$ |
| 0.65% | $\mu(q) + 2.5\sigma(q)$ |
| 0.15% | $\mu(q) + 3.0\sigma(q)$ |
| 0.02% | $\mu(q) + 3.5\sigma(q)$ |
| $\dfrac{1 - \text{erf}\left(\dfrac{x}{\sqrt{2}}\right)}{2}$ | $\mu(q) + x\sigma(q)$ |

For instance, if $e\epsilon=2.3\%$, then $B_0(q)$ should be set to $\mu(q)+2.0\sigma(q)$.

Figure 6:
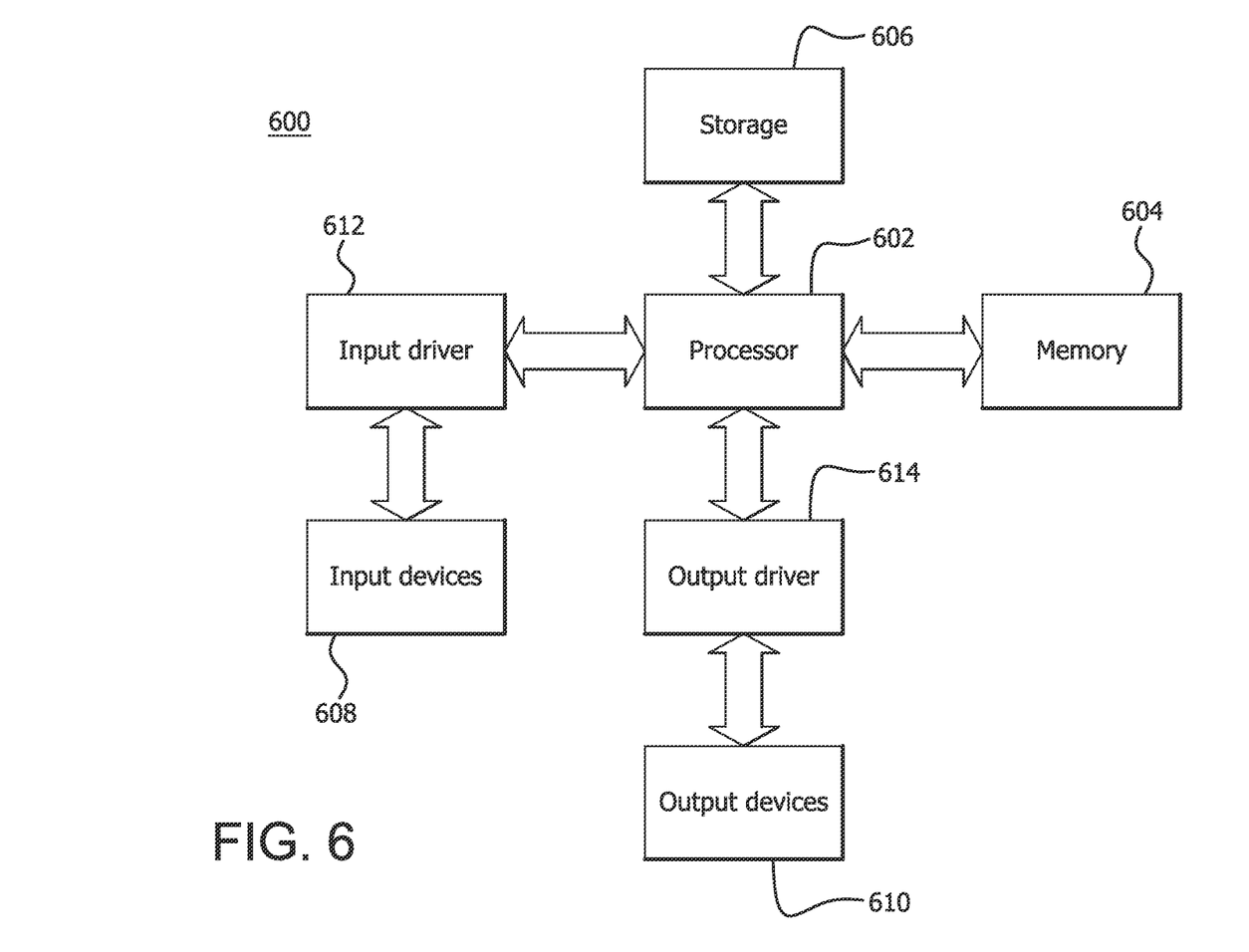
FIG. 6 is a block diagram of an example source or destination device for use with embodiments of the video encoders according to some embodiments.

FIG. 6 is a block diagram of a device 600 in which the video encoders described herein may be implemented, according to some embodiments. The device 600 may include, for example, a computer, a gaming device, a handheld device, a set-top box, a television, a mobile phone, or a tablet computer. The device 600 includes a processor 602, a memory 604, a storage 606, one or more input devices 608, and one or more output devices 610. The device 600 may also optionally include an input driver 612 and an output driver 614. It is understood that the device 100 may include additional components not shown in FIG. 6.

The processor 602 may include a central processing unit (CPU), a graphics processing unit (GPU), a CPU and GPU located on the same die, or one or more processor cores, wherein each processor core may be a CPU or a GPU. The memory 604 may be located on the same die as the processor 602, or may be located separately from the processor 602. The memory 604 may include a volatile or non-volatile memory, for example, random access memory (RAM), dynamic RAM, or a cache. In some embodiments, the high throughput video encoders are implemented in the processor 602.

The storage 606 may include a fixed or removable storage, for example, a hard disk drive, a solid state drive, an optical disk, or a flash drive. The input devices 608 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 610 may include a display, a speaker, a printer, a haptic feedback device, one or more lights, an antenna, or a network connection (e.g., a wireless local area network card for transmission and/or reception of wireless IEEE 802 signals).

The input driver 612 communicates with the processor 602 and the input devices 608, and permits the processor 602 to receive input from the input devices 608. The output driver 614 communicates with the processor 602 and the output devices 610, and permits the processor 602 to send output to the output devices 610. It is noted that the input driver 612 and the output driver 614 are optional components, and that the device 600 will operate in the same manner if the input driver 612 and the output driver 614 are not present.

The video encoders described herein may use a variety of encoding schemes including, but not limited to, Moving Picture Experts Group (MPEG) MPEG-1, MPEG-2, MPEG-4, MPEG-4 Part 10, Windows® *.avi format, Quicktime® *.mov format, H.264 encoding schemes, High Efficiency Video Coding (HEVC) encoding schemes and streaming video formats.

It should be understood that many variations are possible based on the disclosure herein. Although features and elements are described above in particular combinations, each feature or element may be used alone without the other features and elements or in various combinations with or without other features and elements.

The methods provided, to the extent applicable, may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein, to the extent applicable, may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for encoding, comprising:
   dividing a received video frame into a plurality of slices including a first slice, wherein each of the plurality of slices includes a plurality of macroblocks;
   predicting a first number of bits that are required to encode a first macroblock based on a quantization parameter, wherein the first macroblock is from the plurality of macroblocks of the first slice;
   on a condition that the number of bits predicted to encode the first macroblock is less than a maximum slice size, predicting, using the quantization parameter, a total number of bits required to encode each of an additional predetermined number of macroblocks subsequent to the first macroblock in the plurality of macroblocks of the first slice;
   on a condition that the total number predicted is greater than the maximum slice size:
      decreasing the additional predetermined number of macroblocks to a decreased number of macroblocks,
      recalculating the total number of bits for the decreased number of macroblocks, and
      reevaluating the quantization parameter based on the recalculated total number of bits; and
   on a condition that the total number predicted is less than the maximum slice size, encoding the first macroblock using the quantization parameter.

2. The method of claim 1, further comprising:
   incrementing the quantization parameter on a condition that the number of bits predicted to encode the first macroblock exceeds the maximum slice size.

3. The method of claim 2, wherein the quantization parameter is incremented by a given value.

4. The method of claim 2, further comprising:
   inserting another slice into the plurality of slices on a condition that a variation in the quantization parameter after incrementing has reached a given threshold.

5. The method of claim 1, wherein the predicting the number of bits required to encode the first macroblock is further based on a predetermined maximum probability and cumulative distribution function of bits generated by the quantization parameter .

6. The method of claim 1, further comprising:
   on a condition that the total number predicted exceeds the maximum slice size, iterating through different configurations of quantization parameters for each of the additional predetermined number of macroblocks to maximize number of macroblocks in the first slice in view of the maximum slice size.

7. The method of claim 6, further comprising:
   decrementing the predetermined number of macroblocks by a given decrement on a condition that the quantization parameter has reached a given threshold and all configurations of the predetermined number of macroblocks exceeds the maximum slice size.

8. The method of claim 7, further comprising:
   inserting another slice into the plurality of slices on a condition that the predetermined number of macroblocks after decrementing is zero; and
   encoding the first macroblock on a condition that another slice is to be inserted.

9. A system for encoding, comprising:
   an input; and
   an encoder communicatively coupled to the input;
   wherein the encoder:
   receives, using the input, a video frame,
   divides the video frame into a plurality of slices including a first slice, wherein each of the plurality of slices includes a plurality of macroblocks;
   predicts a number of bits required to encode a first macroblock based on a quantization parameter, wherein the first macroblock is from the plurality of macroblocks of the first slice;
   on a condition that the number of bits predicted to encode the first macroblock is less than a maximum slice size, predicts, using the quantization parameter, a total number of bits required to encode each of an additional predetermined number of macroblocks subsequent to the first macroblock in the plurality of macroblocks of the first slice;

on a condition that the total number predicted is greater than the maximum slice size:

decreases the additional predetermined number of macroblocks to a decreased number of macroblock, recalculates the total number of bits for the decreased number of macroblocks, reevaluates the quantization parameter based on the recalculated total number of bits; and on a condition that the total number predicted is less than the maximum slice size, encoding the first macroblock using the quantization parameter.

10. The system of claim 9, wherein a pre-analyzer encoder is configured to increment the quantization parameter on a condition that the number of bits predicted to encode the first macroblock exceeds the maximum slice size.

11. The system of claim 9, wherein the quantization parameter is incremented by a given value.

12. The system of claim 9, wherein a pre-analyzer encoder is configured to insert another slice into the plurality of slices on a condition that a variation in the quantization parameter after incrementing has reached a given threshold.

13. The system of claim 9, wherein the encoder predicts the number of bits required to encode the first macroblock based further on a predetermined maximum probability and cumulative distribution function of bits generated by the quantization parameter .

14. The system of claim 9, wherein the encoder further:

on a condition that the total number predicted exceeds the maximum slice size, iterates through different configurations of quantization parameters for each of the additional predetermined number of macroblocks to maximize number of macroblocks in the first slice in view of the maximum slice size.

15. The system of claim 14, wherein the encoder further decrements the predetermined number of macroblocks by a given decrement on a condition that that the quantization parameter has reached a given threshold and all configurations of the predetermined number of macroblocks exceeds the maximum slice size .

16. The system of claim 15, wherein the encoder is configured to insert another slice on a condition that the predetermined number of macroblocks after decrementing is zero and the encoder is configured to encode a current macroblock on a condition that another slice is to be inserted.

17. A method for encoding, comprising:

predicting, for a given probability, whether encoding a current macroblock with a quantization parameter results in a number of bits that exceeds a current slice size constraint, wherein the current macroblock is one of a plurality of macroblocks that comprise one of a plurality of slices of a video frame;

calculating, for the given probability, whether encoding each of an additional given number of macroblocks using the quantization parameter results in a total number of bits that exceeds the current slice size constraint, wherein each of the additional given number of macroblocks are subsequent to the current macroblock in the plurality of macroblocks;

on a condition that the total number of bits exceeds the current slice constraint:

decreasing the additional given number of macroblocks to a decreased number of macroblocks, recalculating, for the given probability, the total number of bits for the decreased number of macroblocks, and reevaluating the quantization parameter based on the total number of bits recalculated; and encoding, using the quantization parameter, the current macroblock on a condition that the total number of bits predicted exceeds the current slice size constraint.

18. The method of claim 17, further comprising:

incrementing the quantization parameter by a given value on a condition that encoding the macroblock exceeds the current slice size constraint; and inserting another slice into the plurality of slices on a condition that a variation in the quantization parameter after incrementing has reached a given threshold.

19. The method of claim 18, further comprising:

iterating through different configurations of quantization parameters for the given number of macroblocks to maximize number of macroblocks in the current slice;

decrementing the given number of macroblocks by a given decrement on a condition that a variation in the quantization parameter has reached a given threshold and all configurations of the given number of macroblocks exceeds the size constraint of the current slice;

inserting another slice into the plurality of slices a condition that the given number of macroblocks after decrementing is zero; and encoding, using the quantization parameter, the current macroblock on a condition that another slice is to be inserted.

* * * * *